(12) United States Patent
Maruyama et al.

(10) Patent No.: US 10,606,531 B2
(45) Date of Patent: Mar. 31, 2020

(54) IMAGE PROCESSING DEVICE, AND OPERATION CONTROL METHOD THEREOF

(71) Applicant: KONICA MINOLTA, INC., Tokyo (JP)

(72) Inventors: Tomoko Maruyama, Toyokawa (JP); Kazuhiro Tomiyasu, Toyokawa (JP); Atsushi Tomita, Toyohashi (JP); Kenichi Sawada, Toyohashi (JP); Hiroshi Sugiura, Toyokawa (JP)

(73) Assignee: Konica Minolta, Inc., Chiyoda-ku (JP)

( * ) Notice: Subject to any disclaimer, the term of this patent is extended or adjusted under 35 U.S.C. 154(b) by 0 days.

(21) Appl. No.: 16/166,382

(22) Filed: Oct. 22, 2018

(65) Prior Publication Data

US 2019/0129665 A1 May 2, 2019

(30) Foreign Application Priority Data

Nov. 1, 2017 (JP) .................................. 2017-211524

(51) Int. Cl.
*G06F 3/12* (2006.01)
*G10L 15/26* (2006.01)
(Continued)

(52) U.S. Cl.
CPC .......... *G06F 3/1237* (2013.01); *G06F 3/1205* (2013.01); *G06F 3/167* (2013.01); *G10L 15/22* (2013.01); *G10L 15/26* (2013.01); *G10L 25/78* (2013.01); *H04N 1/00403* (2013.01); *H04N 1/00925* (2013.01); *G10L 2015/223* (2013.01);
(Continued)

(58) Field of Classification Search
None
See application file for complete search history.

(56) References Cited

U.S. PATENT DOCUMENTS

2006/0114498 A1\* 6/2006 Yanagi ............... H04N 1/00209
358/1.15
2007/0150289 A1 6/2007 Sakuramoto et al.
(Continued)

FOREIGN PATENT DOCUMENTS

| EP | 3 220 620 | 9/2017 |
|---|---|---|
| JP | 2010136335 A | 6/2010 |
| JP | 2017032844 A | 2/2017 |

OTHER PUBLICATIONS

Extended European Search Report issued in corresponding European Patent Application No. 18202838-1, dated Feb. 12, 2019 (8 pages).

*Primary Examiner* — Frantz Bataille
(74) *Attorney, Agent, or Firm* — Buchanan Ingersoll & Rooney PC

(57) ABSTRACT

An image processing device capable of executing a plurality of jobs that differ in kind, the image processing device includes: a controller that controls execution of an input job; and a detection part that, on the basis of a voice detected by a voice detector, detects that any of a plurality of predetermined target voices has been emitted, wherein in a case where it is detected that the target voice has been emitted during a target setting period corresponding to a job that is being executed, among setting periods that are defined beforehand according to kinds of jobs respectively, the controller stops the execution of the job.

15 Claims, 18 Drawing Sheets

(51) Int. Cl.
  *H04N 1/00*    (2006.01)
  *G10L 25/78*   (2013.01)
  *G10L 15/22*   (2006.01)
  *G06F 3/16*    (2006.01)

(52) U.S. Cl.
  CPC .. *G10L 2015/228* (2013.01); *G10L 2025/783* (2013.01)

(56) References Cited

U.S. PATENT DOCUMENTS

| | | |
|---|---|---|
| 2010/0110489 A1 | 5/2010 | Kanda |
| 2016/0037009 A1 | 2/2016 | Ito et al. |
| 2017/0041485 A1* | 2/2017 | Suzuki ............... H04N 1/00925 |
| 2017/0269889 A1* | 9/2017 | Nobutani ................ G06F 21/32 |

* cited by examiner

| KINDS OF JOB | PROGRESS STAGES OF JOB | VOICE DETECTION MODE | | |
|---|---|---|---|---|
| | | EXECUTE/ NOT EXECUTE | LEVEL CHANGE A | LEVEL CHANGE B |
| SCAN | EARLY STAGE OF READING | EXECUTE | HIGH | HIGH |
| | DURING READING (OTHER THAN EARLY STAGE) | EXECUTE | HIGH | LOW |
| | EARLY STAGE OF TRANSMISSION | EXECUTE | HIGH | LOW |
| | DURING TRANSMISSION (OTHER THAN EARLY STAGE) | NOT EXECUTE | LOW | NOT EXECUTE |
| FAX TRANSMISSION | EARLY STAGE OF READING | EXECUTE | HIGH | HIGH |
| | DURING READING (OTHER THAN EARLY STAGE) | EXECUTE | HIGH | LOW |
| | EARLY STAGE OF TRANSMISSION | EXECUTE | HIGH | LOW |
| | DURING TRANSMISSION (OTHER THAN EARLY STAGE) | NOT EXECUTE | LOW | NOT EXECUTE |
| COPY | EARLY STAGE OF READING | EXECUTE | HIGH | HIGH |
| | DURING READING (OTHER THAN EARLY STAGE) | EXECUTE | HIGH | LOW |
| | EARLY STAGE OF PRINTING | EXECUTE | HIGH | LOW |
| | DURING PRINTING (OTHER THAN EARLY STAGE) | NOT EXECUTE | LOW | NOT EXECUTE |
| GROUP COPY | EARLY STAGE OF READING | EXECUTE | HIGH | HIGH |
| | DURING READING (OTHER THAN EARLY STAGE) | EXECUTE | HIGH | LOW |
| | EARLY STAGE OF PRINTING | EXECUTE | HIGH | HIGH |
| | DURING PRINTING A | NOT EXECUTE | LOW | NOT EXECUTE |
| | DURING PRINTING B | EXECUTE | HIGH | LOW |
| | DURING PRINTING C | NOT EXECUTE | LOW | NOT EXECUTE |
| SORTING COPY | EARLY STAGE OF READING | EXECUTE | HIGH | HIGH |
| | DURING READING (OTHER THAN EARLY STAGE) | EXECUTE | HIGH | LOW |
| | EARLY STAGE OF PRINTING | EXECUTE | HIGH | HIGH |
| | DURING PRINTING D | NOT EXECUTE | LOW | NOT EXECUTE |
| | DURING PRINTING E | EXECUTE | HIGH | HIGH |
| | DURING PRINTING F | NOT EXECUTE | LOW | LOW |
| | DURING PRINTING G | EXECUTE | HIGH | HIGH |
| | DURING PRINTING H | NOT EXECUTE | LOW | NOT EXECUTE |

GROUP COPY
- DURING PRINTING A: OTHER THAN EARLY STAGE OF PRINTING OF FIRST PAGE
- DURING PRINTING B: EARLY STAGE OF PRINTING OF EACH PAGE OF SECOND PAGE OR LATER
- DURING PRINTING C: DURING PRINTING (OTHER THAN EARLY STAGE) OF EACH PAGE OF SECOND PAGE OR LATER

SORTING COPY
- DURING PRINTING D: OTHER THAN EARLY STAGE OF PRINTING OF FIRST COPY
- DURING PRINTING E: IMMEDIATELY AFTER PRINTING OF FIRST COPY IS COMPLETED (EARLY STAGE OF PRINTING OF SECOND COPY)
- DURING PRINTING F: DURING PRINTING OF SECOND COPY (OTHER THAN EARLY STAGE)
- DURING PRINTING G: IMMEDIATELY AFTER COMPLETION OF PRINTING OF EACH COPY OF SECOND COPY OR LATER EXCLUDING LAST COPY
- DURING PRINTING H: DURING PRINTING (OTHER THAN EARLY STAGE) OF EACH COPY OF THIRD COPY OR LATER

FIG. 7

| DETECTION LEVELS (SENSITIVITY) (CATEGORIES) 820 | DETECTION CONDITIONS 821 | | | |
|---|---|---|---|---|
| | VOLUME 822 | TONE 823 | REPETITION 824 | TARGET VOICE (VOICE SPECIFICATION CONDITIONS) 825 |
| HIGH (HIGHEST LEVEL) | SMALL OR MORE | LOW, MEDIUM, HIGH | NO REPETITION | REGULAR OPERATION WORDS, ASSUMED WORDS, OTHERS |
| MEDIUM | MEDIUM OR MORE | MEDIUM, HIGH | NO REPETITION | REGULAR OPERATION WORDS, ASSUMED WORDS |
| LOW (LOWEST LEVEL) | ONLY LARGE | HIGH | REPETITION | REGULAR OPERATION WORDS |

| GROUP | WORD | REGISTRATION ATTRIBUTE |
|---|---|---|
| REGULAR OPERATION WORDS | STOP | DEFAULT |
| | TOMARE (: STOP) | DEFAULT |
| | TEISHI (: STOP) | USER SETTING |
| | ⋮ | ⋮ |
| ASSUMED WORDS | SHIMATTA | DEFAULT |
| | YABAI | DEFAULT |
| | CHIGAU | DEFAULT |
| | MACHIGATTA | DEFAULT |
| | ⋮ | ⋮ |
| OTHERS | AH | DEFAULT |
| | EH | DEFAULT |
| | UWAH | DEFAULT |
| | MAZUI | DEFAULT |
| | YABAI | DEFAULT |
| | AKAN | DEFAULT |
| | ⋮ | ⋮ |

| GROUP | WORD | REGISTRATION ATTRIBUTE |
|---|---|---|
| REGULAR OPERATION WORDS | STOP | DEFAULT |
| | TOMARE (: STOP) | DEFAULT |
| | TEISHI (: STOP) | USER SETTING |
| | ⋮ | ⋮ |
| ASSUMED WORDS | SHIMATTA | DEFAULT |
| | YABAI | DEFAULT |
| | CHIGAU | DEFAULT |
| | MACHIGATTA | DEFAULT |
| | ⋮ | ⋮ |
| | MAZUI | LEARNING |
| | AH | LEARNING |
| | UWAH | LEARNING |
| OTHERS | EH | DEFAULT |
| | YABAI | DEFAULT |
| | AKAN | DEFAULT |
| | ⋮ | ⋮ |

| KINDS OF JOB | PROGRESS STAGES OF JOB | STOP CONTROL CORRESPONDING TO VOICE DETECTION |
|---|---|---|
| SCAN | EARLY STAGE OF READING | EXECUTE |
|  | DURING READING (OTHER THAN EARLY STAGE) | EXECUTE |
|  | EARLY STAGE OF TRANSMISSION | EXECUTE |
|  | DURING TRANSMISSION (OTHER THAN EARLY STAGE) | NOT EXECUTE |
| FACSIMILE MACHINE | EARLY STAGE OF READING | EXECUTE |
|  | DURING READING (OTHER THAN EARLY STAGE) | EXECUTE |
|  | EARLY STAGE OF TRANSMISSION | EXECUTE |
|  | DURING TRANSMISSION (OTHER THAN EARLY STAGE) | NOT EXECUTE |
| COPY | EARLY STAGE OF READING | EXECUTE |
|  | DURING READING (OTHER THAN EARLY STAGE) | EXECUTE |
|  | EARLY STAGE OF PRINTING | EXECUTE |
|  | DURING PRINTING (OTHER THAN EARLY STAGE) | NOT EXECUTE |
| GROUP COPY | EARLY STAGE OF READING | EXECUTE |
|  | DURING READING (OTHER THAN EARLY STAGE) | EXECUTE |
|  | EARLY STAGE OF PRINTING | EXECUTE |
|  | DURING PRINTING A | NOT EXECUTE |
|  | DURING PRINTING B | EXECUTE |
|  | DURING PRINTING C | NOT EXECUTE |
| SORTING COPY | EARLY STAGE OF READING | EXECUTE |
|  | DURING READING (OTHER THAN EARLY STAGE) | EXECUTE |
|  | EARLY STAGE OF PRINTING | EXECUTE |
|  | DURING PRINTING D | NOT EXECUTE |
|  | DURING PRINTING E | EXECUTE |
|  | DURING PRINTING F | NOT EXECUTE |
|  | DURING PRINTING G | EXECUTE |
|  | DURING PRINTING H | NOT EXECUTE |

DURING PRINTING A: OTHER THAN EARLY STAGE OF PRINTING OF FIRST PAGE
DURING PRINTING B: EARLY STAGE OF PRINTING OF EACH PAGE OF SECOND PAGE OR LATER
DURING PRINTING C: DURING PRINTING (OTHER THAN EARLY STAGE) OF EACH PAGE OF SECOND PAGE OR LATER

DURING PRINTING D: OTHER THAN EARLY STAGE OF PRINTING OF FIRST COPY
DURING PRINTING E: IMMEDIATELY AFTER PRINTING OF FIRST COPY IS COMPLETED (EARLY STAGE OF PRINTING OF SECOND COPY)
DURING PRINTING F: DURING PRINTING OF SECOND COPY (OTHER THAN EARLY STAGE)
DURING PRINTING G: IMMEDIATELY AFTER COMPLETION OF PRINTING OF EACH COPY OF SECOND COPY OR LATER EXCLUDING LAST COPY
DURING PRINTING H: DURING PRINTING (OTHER THAN EARLY STAGE) OF EACH COPY OF THIRD COPY OR LATER

IMAGE PROCESSING DEVICE, AND OPERATION CONTROL METHOD THEREOF

The entire disclosure of Japanese patent Application No. 2017-211524, filed on 2018, Nov. 1, 2017, is incorporated herein by reference in its entirety.

BACKGROUND

Technological Field

The present invention relates to an image processing device, and an operation control method thereof.

Description of the Related Art

With the progress of voice recognition technologies, voice operation of inputting a voice instruction by a user is put to practical use in various apparatuses. In general, at the time of voice operation, a user presses a vocalization button (microphone icon), or emits fixed form words for talking to an apparatus, and consequently the apparatus is brought into an instruction waiting state. After that, the user emits instruction words.

Meanwhile, image processing devices such as a copy machine, a facsimile machine, and a Multi-functional Peripheral (MFP) (multifunctional machine or complex machine) are each provided with an operation panel for contact-type operation. In general, not only hard keys such as a start key and a stop key, but also a touch panel display that allows various operations, are arranged on the operation panel. In a case where complicated operation is performed, in particular, for example, in a case where a user wants to execute a job that includes many items to set, the contact-type operation is more efficient than the voice operation.

Incidentally, after a user inputs a desired job into an image processing device, while the image processing device executes the job, there is a possibility of causing a situation in which the user notices a setting error of the job, and accordingly wants to stop the operation of the image processing device. In this case, instantly pressing a stop key on the operation panel can avoid a trouble. However, if it takes a long time until the stop key is pressed, processing of the job steadily progresses during this time. As the result, for example, printing may be uselessly performed, or image data may be transmitted to a wrong destination.

As the prior art, technologies for quickly stopping the execution of a job are disclosed in JP 2010-136335 A and JP 2017-32844 A.

JP 2010-136335 A discloses an image forming device in which when a spoken voice as the operation by a user is recognized, an operating state is changed to a stopped state.

JP 2017-32844 A discloses a copy machine in which after processing is started, in a case where a predetermined voice is detected during a predetermined time period, the processing is interrupted.

According to the technology disclosed in JP 2010-136335 A, a voice instruction to stop is always accepted during the execution of a job. Therefore, there arises a problem that there is a large possibility of misrecognizing a voice, in other words, there is a possibility of easily causing a situation in which the operation will be stopped by mistake. Thus, completion of the job is delayed due to useless stop that is not intended by a user, and consequently the productivity of image formation decreases.

The technology of JP 2017-32844 A is based on the knowledge that as time passes from the start of processing, the significance of interrupting the processing often decreases. Therefore, the timing in which a voice instruction to interrupt is accepted is limited within the predetermined time elapsed from the start of the processing. As the result, accidental interruption caused by misrecognition of a voice can be suppressed However, the timing in which the user notices an error of the operation in which the job has been set differs depending of a kind of the job.

For example, a copy job that reads images from sheets of original document, and then prints the images on sheets of paper includes: group copy that prints an image of each sheet of original document in units of a plurality of sheets in the order of reading; and sorting copy that repeats the operation of printing an image of each sheet of original document on one sheet of paper in the order of reading to make a plurality of copies.

As an example of operation errors, assuming a case where the number of copies is larger than the number of desired copies (including a case where settings of the previous job remain), the timing in which a user notices an error is considered in the following manner.

In the case of the group copy, after reading of an image ends, printing is started, and until printing of an image of the second sheet of original document starts, a user often notices an error.

Meanwhile, in the case of the sorting copy, after printing of the desired number of copies has been completed, when printing of subsequent copies is started, a user often notices an error.

In this manner, the timing in which the user notices an error of the operation in which the job is set differs depending on a kind of the job. Moreover, even if the kind is the same, the timing is earlier or later depending on conditions of the job, including the number of sheets of original documents, and the number of copies.

Therefore, if acceptance of a voice instruction is stopped in a stage in which a fixed period of time has passed from the start of the job, there is a possibility of causing a situation in which a user cannot stop the operation by a voice even if the user notices an error.

SUMMARY

The present invention has been made taking such problems into consideration, and an object of the present invention is to suppress useless stop of the execution of a job, and to suppress the occurrence of a situation in which a user cannot stop the operation by a voice.

To achieve the abovementioned object, according to an aspect of the present invention, an image processing device capable of executing a plurality of jobs that differ in kind reflecting one aspect of the present invention comprises: a controller that controls execution of an input job; and a detection part that, on the basis of a voice detected by a voice detector, detects that any of a plurality of predetermined target voices has been emitted, wherein in a case where it is detected that the target voice has been emitted during a target setting period corresponding to a job that is being executed, among setting periods that are defined beforehand according to kinds of jobs respectively, the controller stops the execution of the job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 1 is a drawing schematically illustrating a configuration of an image processing device according to an embodiment of the present invention;

FIG. 6 is a drawing illustrating, as an example, data of a period table;

FIG. 7 is a drawing illustrating, as an example, data of a condition table;

FIGS. 8A and 8B are drawings illustrating, as an example, data of a word table and updating of the word table;

FIG. 14 is a drawing illustrating, as an example, data of the period table;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
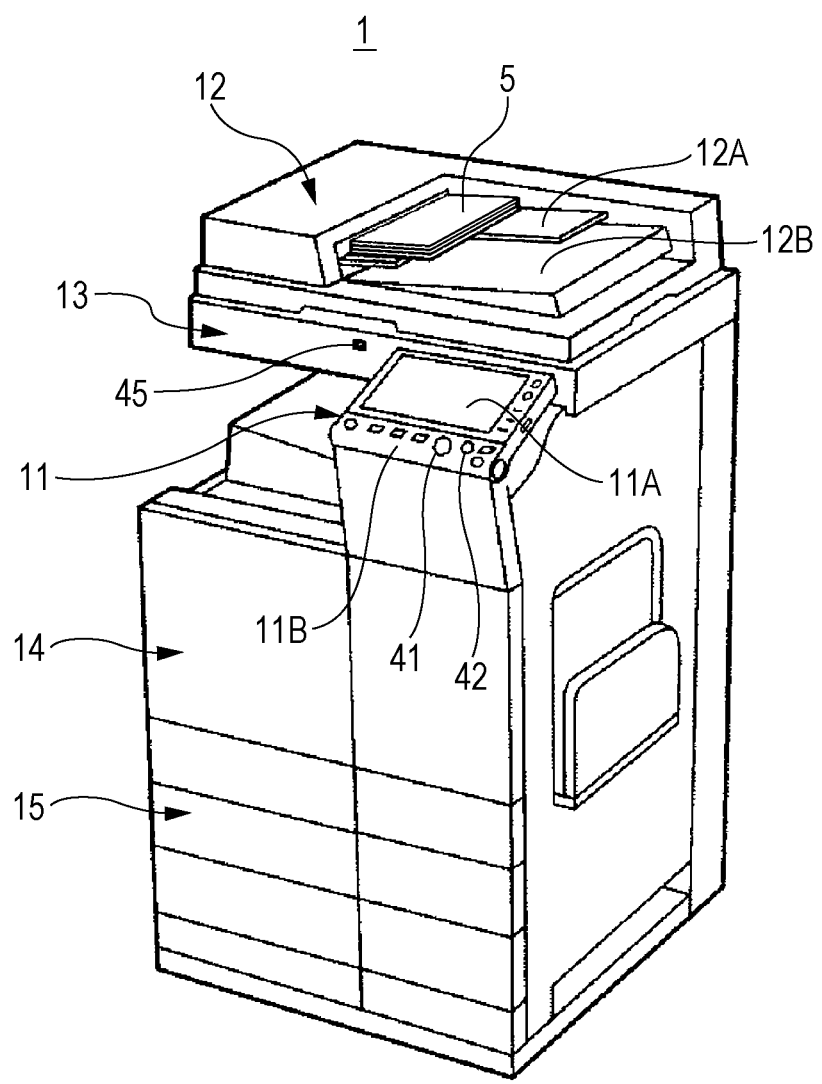
Figure 2:
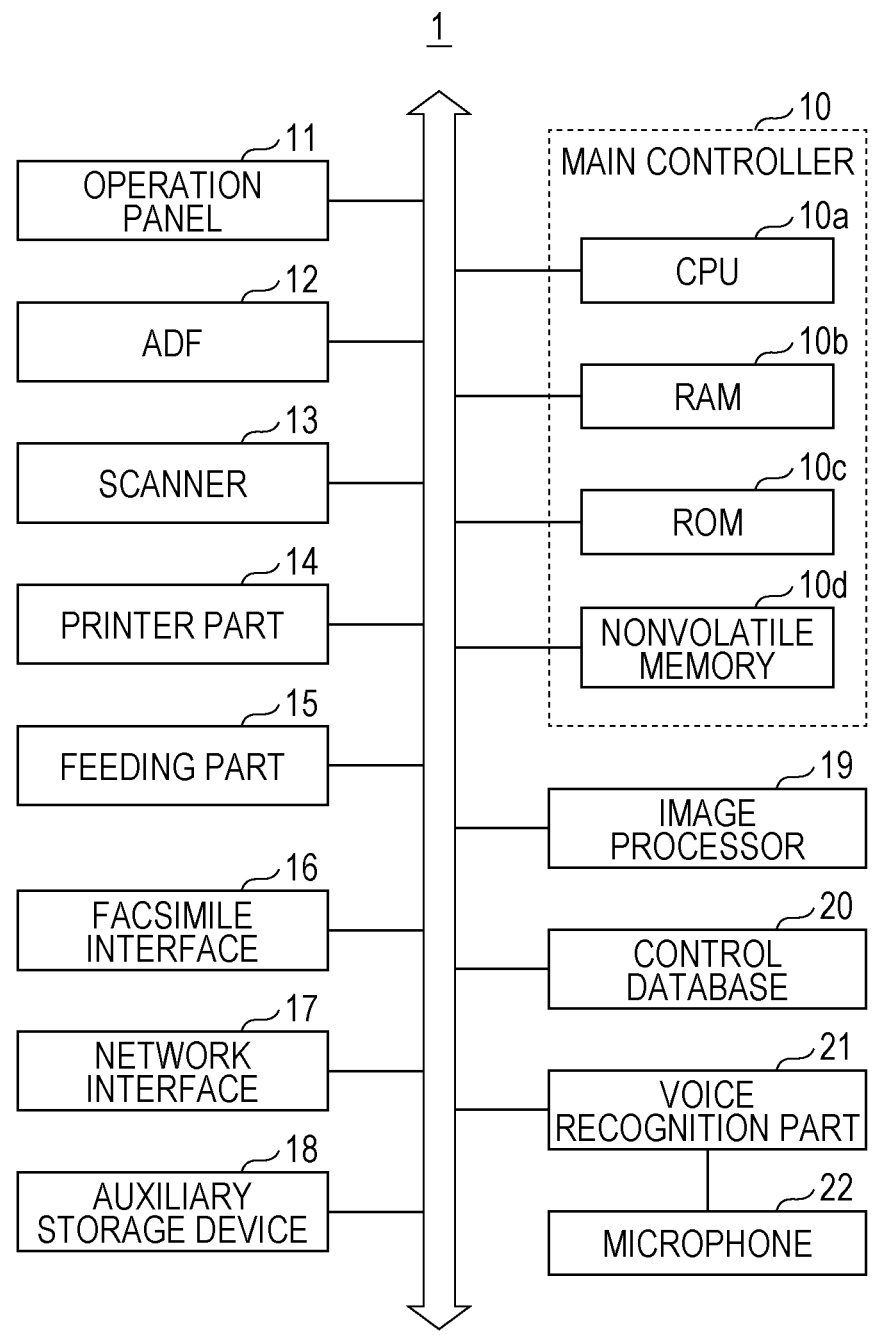
FIG. 2 is a diagram illustrating a hardware configuration of the image processing device.

FIG. 1 illustrates, as an example, an external appearance of an image processing device 1 according to an embodiment of the present invention; and FIG. 2 illustrates a hardware configuration of the image processing device 1.

The image processing device 1 is a Multi-functional Peripheral (MFP) (a multifunctional machine or a complex machine) into which functions such as a copy machine, an image reader, and a facsimile machine are put together. In other words, the image processing device 1 is capable of executing different kinds of jobs such as copy, scan, and fax. In addition, the image processing device 1 is configured to be capable of performing multi-operation that executes a plurality of jobs in parallel; for example, during printing operation in a copy process, performing original document reading operation for another copy process.

As shown in FIG. 1, the image processing device 1 is provided with an operation panel 11, an auto document feeder (Auto Document Feeder (ADF)) 12, a flatbed type scanner 13, a printer part 14, a feeding part 15, and a microphone 22. Further, as shown in FIG. 2, the image processing device 1 is provided with a main controller 10, a facsimile interface 16, a network interface 17, an auxiliary storage device 18, an image processor 19, a control database 20, a voice recognition part 21, and the like.

The operation panel 11 includes: a touch panel display 11A that displays a screen on which a user is allowed to operate; and a key input part 11B on which hard keys such as a start key 41 and a stop key 42 are arranged. The operation panel 11 outputs a signal corresponding to input operation. According to this signal, the operation of the image processing device 1 is controlled by the main controller 10.

The auto document feeder 12 transports a sheet-shaped original document 5 set in an original document tray 12A to a moving reading position of the scanner 13. The transportation is further continued to discharge the original document 5 to a paper discharge tray 12B of the original document tray 12A. In a case where the number of sheets of the original document 5 is two or more, the sheets are consecutively taken out and transported from the original document tray 12A one by one. The auto document feeder 12 is openably/closably provided as a cover that covers platen glass of the scanner 13.

The scanner 13 reads an image of the original document 5 transported from the auto document feeder 12, or an image of an original document set on the platen glass by the user, and then generates image data. The scanner 13 is capable of monochrome (gray scale) reading and full color reading.

The printer part 14 prints the image read by the scanner 13 in a copy job on a single side or both sides of a sheet (recording paper) supplied from the feeding part 15. The printer part 14 is also used to print, for example, a document that has been input from an external host or has been read from an internal box, and an image that has been received by facsimile communication. A printing method is, for example, electrophotographic printing, and is capable of monochrome printing and full color printing. The printing method may be ink jet printing or other methods.

The feeding part 15 is provided with a plurality of paper feed trays, each of which is capable of storing multiple sheets. The feeding part 15 takes out a sheet from a selected paper feed tray, and supplies the sheet to the printer part 14.

The microphone 22 is arranged at, for example, a front surface part of a housing of the scanner 13, and converts a voice around the image processing device 1 into an electric signal, and then outputs the electric signal. The microphone 22 is an example of a voice detector for detecting a voice.

The main controller 10 takes charge of the overall control of the image processing device 1. The main controller 10 is provided with a CPU 10a, a RAM 10b, a ROM 10c and a nonvolatile memory 10d.

In order to operate the image processing device 1 as a copy machine, a facsimile machine, an image reader and the like, the ROM 10c or the nonvolatile memory 10d stores a program for controlling the auto document feeder 12, the scanner 13 and the printer part 14. Moreover, the ROM 10c or the nonvolatile memory 10d stores a voice operation program for, when emission of a specific voice described later is detected, controlling stopping of execution of a job. These programs are loaded into the RAM 10b as necessary, and are executed by the CPU 10a.

The facsimile interface 16 is an interface to exchange image data with an external facsimile terminal by using a protocol such as G3. A telephone line, Internet and the like are used as a communication line.

The network interface 17 is an interface to communicate with an external information processing device such as a personal computer and a smart phone through a communication line. A local area network line (LAN line), Internet and the like are used as a communication line.

The auxiliary storage device 18 stores, for example, image data transmitted from the main controller 10, and data of a document transferred from an external device. A Hard Disk Drive (HDD) or a Solid State Drive (SSD) is used as the auxiliary storage device 18.

The image processor 19 subjects image data transmitted from the scanner 13 to processing related to characteristics of a read optical system, the processing including shading correction, and chromatic aberration correction. In addition, the image processor 19 performs, for example, conversion of a data format, and compression/decompression of image data when image data is exchanged between the CPU 10a and the auxiliary storage device 18.

The control database 20 is a storage means for storing various kinds of data, which the CPU 10a or the like refers to, in such a manner that the data can be easily modified. The control database 20 may be provided in, for example, the auxiliary storage device 18 or the nonvolatile memory 10d. Information stored in the control database 20 includes information that is required to be updated as needed, that is to say, not only information related to user registration of the image processing device 1, but also, for example, information related to a box assigned to a user (an individual or a group) as a data storage area.

The voice recognition part 21 is a voice recognition engine that converts words spoken by a person into a text, the words being included in an audio signal input from the microphone 22. For a user having difficulty in vocalization, a text can be generated from a sound made by a buzzer, a bell, a hand clap or the like by regarding a specific sound other than voices as words.

In order to recognize a voice, it is possible to use a publicly-known acoustic analysis technique in which phonemes are extracted from an audio signal, and are then compared with an acoustic model. In addition, at the time of voice recognition, a tone (pitch of a sound perceived by a person) of a voice can be determined by, for example, a technique for subjecting an audio signal to Fourier transform.

Incidentally, the image processing device 1 has a "voice operation function" of, when a predetermined target voice is emitted during execution of a job, detecting that the target voice has been emitted, and stopping the execution of the job. The configuration and operation of the image processing device 1 will be described below by focusing mainly on this voice operation function.

Figure 3:
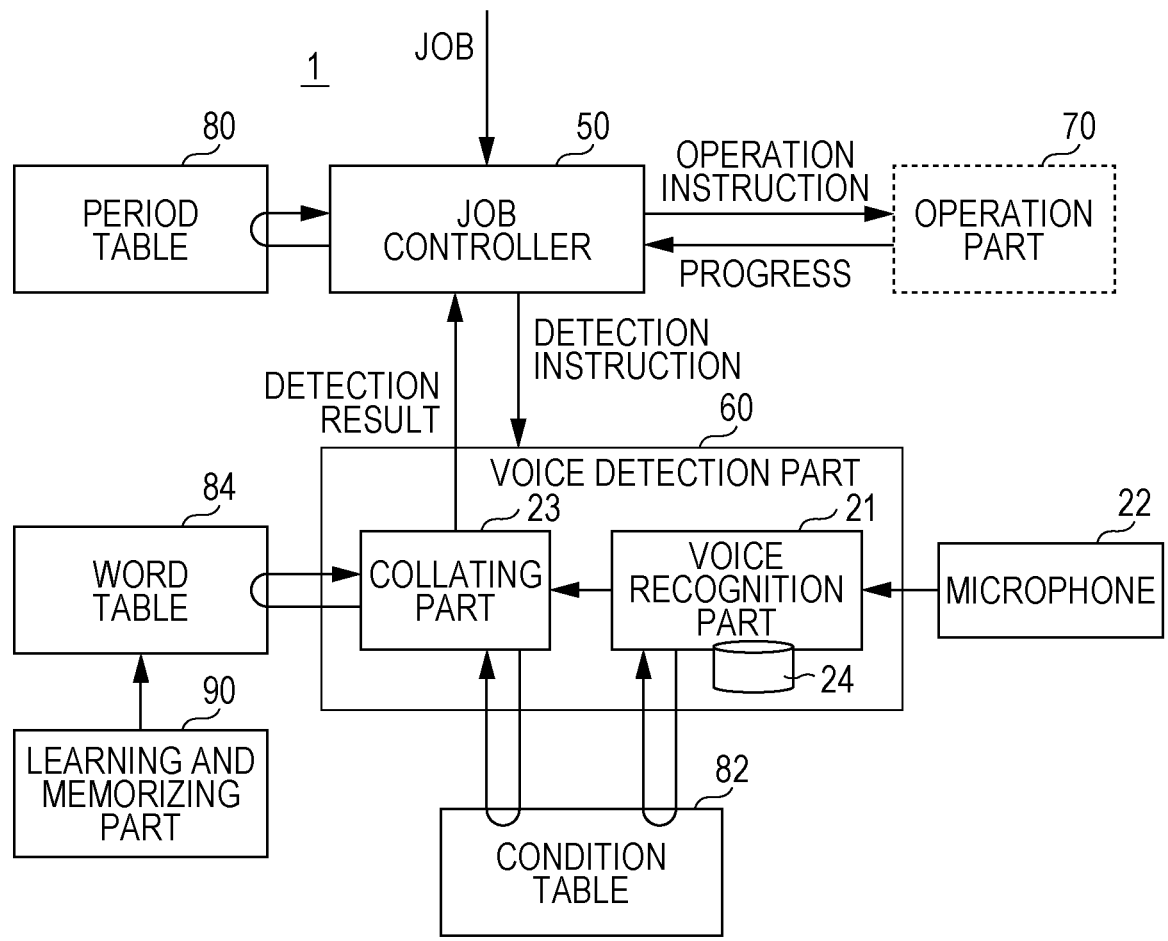
FIG. 3 is a diagram illustrating a first example of a functional configuration of essential parts related to a voice operation function.
Figure 4:
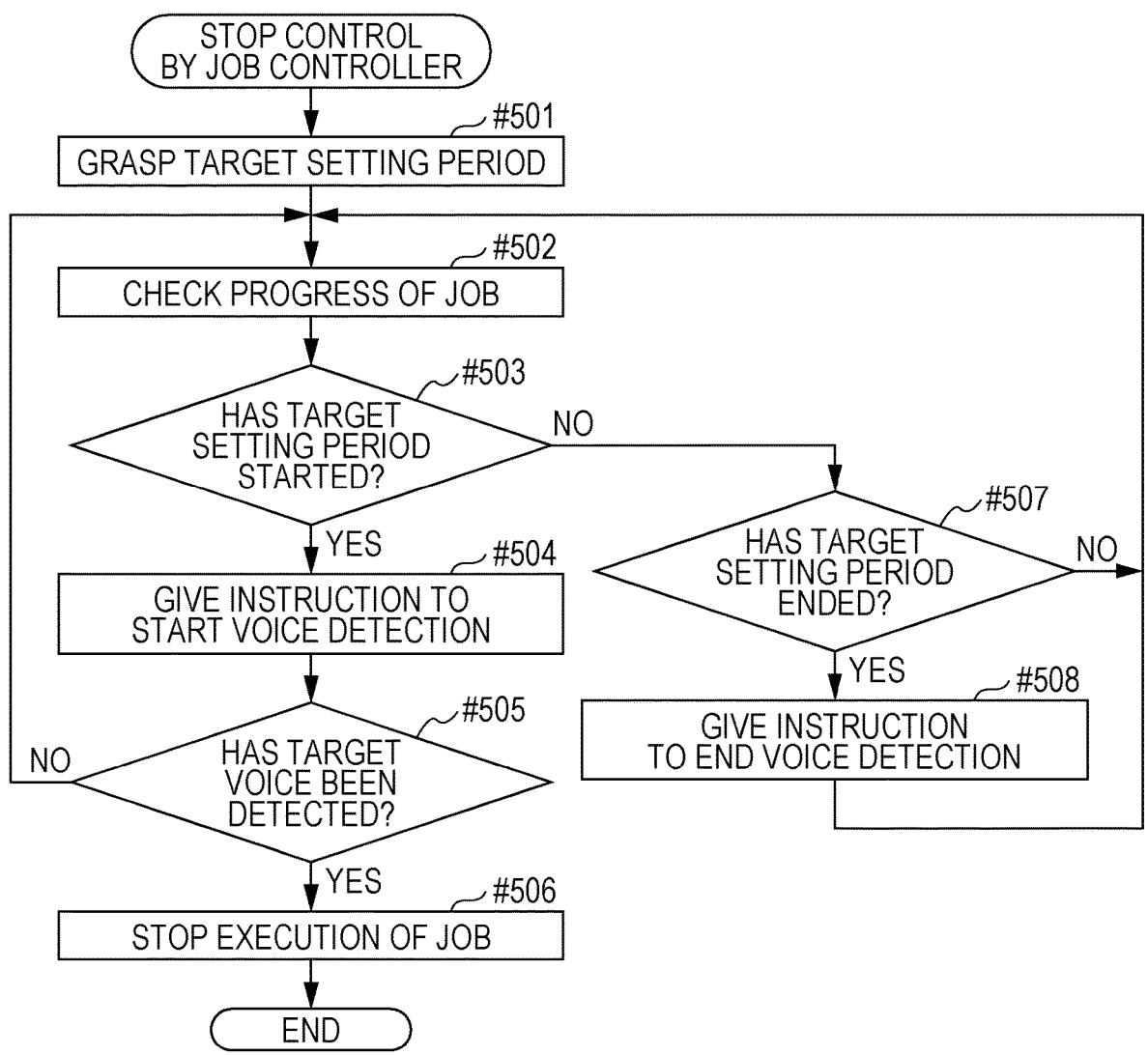
FIG. 4 is a drawing illustrating a flow of stop control processing in a job controller.
Figure 5:
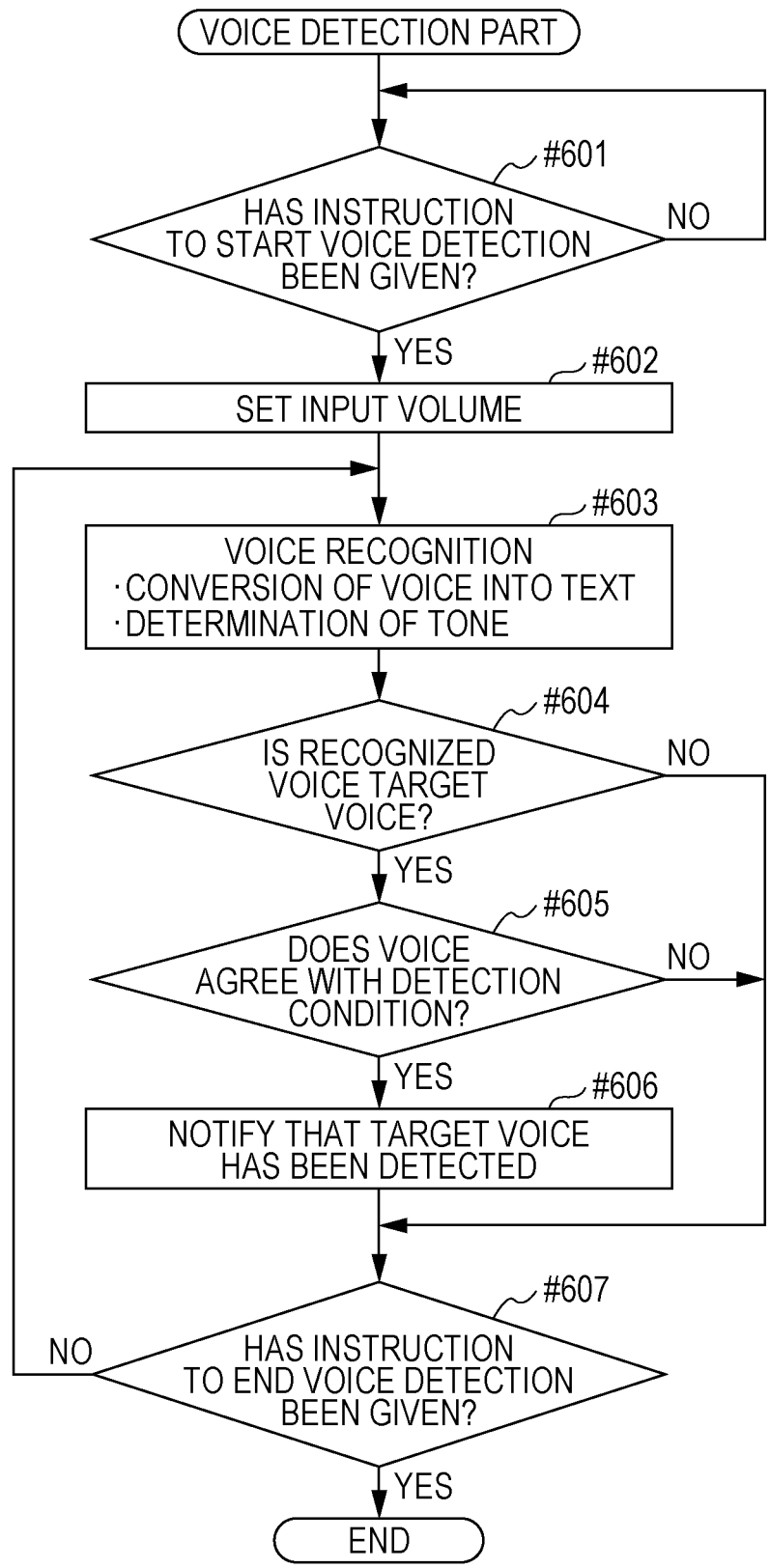
FIG. 5 is a drawing illustrating a flow of processing in a voice detection part.

FIG. 3 illustrates a first example of a functional configuration of essential parts related to the voice operation function; FIG. 4 illustrates a flow of stop control processing in the job controller; and FIG. 5 illustrates a flow of processing in the voice detection part.

In FIG. 3, the image processing device 1 includes a job controller 50, a voice detection part 60, a period table 80, a condition table 82, and a word table 84. Hardware and the CPU 10a of the main controller 10 execute an image processing program, and consequently functions of the job controller 50 and the voice detection part 60 are realized.

The period table 80 indicates setting periods that are defined beforehand according to kinds of jobs respectively; and the condition table 82 indicates a plurality of detection conditions that determine easiness to obtain a detection result that a target voice has been emitted. The word table 84 indicates a plurality of predetermined target voices. The condition table 82 is an example of a subtable.

The job controller 50 controls execution of a job that has been input into the image processing device 1 by a user. In other words, the job controller 50 gives an operation instruction to an operation part 70 according to a job to be executed. In addition, the job controller 50 grasps a progress of the job by a notification from the operation part 70, and changes an instruction destination and contents of the instruction in accordance with the progress of the job as appropriate. The operation part 70 is a generic name of hardware and software related to the execution of the job, and includes the auto document feeder 12, the scanner 13, and the printer part 14.

In addition, the job controller 50 realizes the voice operation function in conjunction with the voice detection part 60. More specifically, in a case where the voice detection part 60 detects that a target voice has been emitted during a target setting period corresponding to a job that is being executed, among the setting periods that are defined beforehand according to kinds of jobs respectively, the job controller 50 gives a stop instruction to the operation part 70 to cause the operation part 70 to stop the execution of the job. The conjunction with the voice detection part 60 will be described later in more detail.

On the basis of a voice detected by the microphone 22, the voice detection part 60 detects that any of the plurality of predetermined target voices has been emitted. The voice detection part 60 includes a voice recognition part 21, and a collating part 23. It should be noted that "detecting that a target voice has been emitted" may be described as "detection of a target voice".

As described above, the voice recognition part 21 recognizes a voice that has been input from the microphone 22, and then converts the voice into a text.

The collating part 23 collates the text of the voice recognized by the voice recognition part 21 with the plurality of target voices registered in the word table 84 in a text form. Subsequently, in a case where the recognized voice agrees with any of the plurality of target voices, the job controller 50 is notified of a detection result indicating that a target voice has been detected. In this case, the execution of the job is stopped.

In the configuration of the example shown in FIG. 3, according to a detection instruction from the job controller 50, the voice detection part 60 detects (voice detection) that a target voice has been emitted. In other words, the job controller 50 controls whether or not the voice detection part 60 performs voice detection. Details will be described as follows.

Referring to FIG. 4, the job controller 50 refers to the period table 80 before the execution of a job, thereby grasping a target setting period that is a setting period determined corresponding to the kind of the job, which is a target to be executed, among the setting periods recorded according to the respective kinds (#501). In other words, the timing in which voice detection is started in the progress of the job, and the timing in which the voice detection is ended, are determined.

During the execution of the job, the progress of the job is monitored (#502), and when the start timing of the target setting period comes (YES in #503), an instruction to start voice detection is given (#504). At this point of time, a voice detection mode is notified. In addition, when the end timing of the target setting period comes (YES in #507), an instruction to end the voice detection is given (#508).

Subsequently, when the voice detection part 60 notifies of a detection result indicating that a target voice has been detected (YES in #505), the execution of the job is stopped. In a case where no detection result is notified (NO in #505), monitoring of the progress is continued without stopping the execution of the job (#502).

Meanwhile, processing is performed as shown in FIG. 5 in the voice detection part 60.

The voice detection part 60 waits for an instruction to start voice detection (#601). When an instruction to start voice detection is given (YES in #601), according to a voice detection mode notified together with the instruction, a volume of a voice that accepts input from the microphone 22 is set (#602). In other words, input sensitivity is increased or decreased. When the input sensitivity is increased, both a large voice and a small voice will be recognized. When the input sensitivity is decreased, only a large voice will be recognized, but a small voice will not be recognized.

Subsequently, voice recognition is immediately started (#603). A voice is converted into a text, and a tone of the voice is determined as necessary.

If the recognized voice is a target voice (YES in #604), it is checked whether or not the voice agrees with (fulfills) a detection condition corresponding to the voice detection mode (#605). In a case where the voice agrees with the detection condition (YES in #605), the job controller 50 is notified that a target voice has been detected (#606). The voice detection is performed until an instruction to end the voice detection is given (NO in #607).

Depending on a kind of a job, there is a case where an instruction to start voice detection is given a plurality of times during the execution of the job. In this case, every time an instruction to start voice detection is given, the voice detection part 60 performs the voice detection until an instruction to end the voice detection is given.

FIG. 6 illustrates an example of data of the period table 80; FIG. 7 illustrates an example of data of the condition table 82; and FIGS. 8A and 8B illustrate, as an example, data of the word table 84 and updating of the word table 84 respectively.

In the period table 80 shown in FIG. 6, kind of job includes "Scan", "Fax transmission", "Copy", "Group copy", and "Sorting copy". For each of these kinds of jobs, the job is divided into a plurality of progress stages. Further, whether or not each progress stage is a setting period is defined on a voice detection mode basis.

As the voice detection modes, "Execute/not execute mode", "Level change A mode", and "Level change B mode" are provided. At the time of operation settings to be performed for the image processing device 1 as appropriate, a user is capable of alternatively selecting one from among these modes.

The execute/not execute mode is a mode in which whether "to execute (to perform)" or "not to execute (not to perform)" voice detection by the voice detection part 60 is defined for each progress stage. A progress stage in which "execute" is defined is a setting period; and a progress stage in which "not execute" is defined is a period other than the setting period. During a setting period in the execute/not execute mode, voice detection is executed according to uniformly defined detection conditions irrespective of the progress stages.

The level change A mode is a mode in which any of a plurality of detection levels (sensitivity categories) 820, which are high, medium and low, shown in FIG. 7 is defined for each progress stage. The highest detection level 820 at which it is easiest to obtain a detection result that a target voice has been emitted is "High"; the second highest detection level 820 is "Medium"; and the lowest detection level 820 at which it is hardest to obtain the detection result is "Low".

The voice detection is executed irrespective of the detection levels 820. Therefore, in the case of the level change A mode, all progress stages are setting periods. However, the easiness to obtain a detection result that a target voice has been emitted differs depending on the detection level.

The level change B mode is a mode in which any of the plurality of detection levels 820, which are high, medium, and low, or "not execute" voice detection, is defined for each progress stage. A progress stage in which any of the detection levels 820 is defined is a setting period; and a progress stage in which "not execute" is defined is a period other than the setting period.

As shown in FIG. 7, each of the detection levels 820 is associated with the detection conditions 821 in the condition table 82.

The detection conditions 821 include a volume condition 822, a tone condition 823, a repetition condition 824, and a voice specification condition (target voice) 825.

The volume condition 822 limits a volume of a voice. An input volume is set in the voice detection part 60 according to this condition. Limiting a volume range to a large volume enables to suppress useless recognition that includes, for example, recognition of a voice heard far away; and extending the volume range so as to include a small volume enables to suppress omission of recognition.

The tone condition 823 limits a tone of a voice. The repetition condition 824 specifies whether or not to include, as a requirement, repetition (iteration) of the same word, for example, "tomare, tomare". When a target voice has been detected by the voice detection part 60, it is checked whether or not the target voice meets the tone condition 823 and the repetition condition 824.

The voice specification condition 825 includes a target voice, the emission of which should be detected. In an example of FIG. 7, a group of target voices is indicated as the voice specification condition 825. Target voices that belong to each group are indicated by the word table 84 (refer to FIGS. 8A and 8B).

In the image processing device 1, a plurality of target voices are grouped into three groups, the number of which is equivalent to the number of detection levels 820. The three groups are "regular operation words", "assumed words" and "others".

In addition, in the condition table 82, the highest detection level 820 (high) among the plurality of detection levels 820 is associated with all groups as the voice specification condition 825, and the second highest or lower detection levels 820 (medium of low) are associated with one or more groups as the voice specification condition 825 in such a manner that with the decrease in level, the number of corresponding groups decreases.

In other words, the highest detection level 820 (high) is associated with regular operation words, assumed words and others, the second highest detection level 820 (medium) is associated with regular operation words and assumed words, and the lowest detection level 820 (low) is associated with only regular operation words.

The number of target voices corresponding to the higher detection level 820 is larger than the number of target voices corresponding to the lower detection level 820. Therefore, on the assumption that the conditions 822 to 824 other than the voice specification condition 825 are not added, the higher detection level 820 makes it easier to obtain a detection result that a target voice has been detected.

The regular operation word is a standard word by which a user gives a voice instruction to stop. As shown in FIG. 8A, "stop", "tomare", "teishi" and the like are registered in the word table 84 as regular operation words. Among the words, "stop" and "tomare" are registered in a factory shipment stage of the image processing device 1, and registration attributes are set at "default". "Teishi" is additionally registered by a user using a user setting function, and a registration attribute thereof is set at "user setting".

The assumed word is a word other than the regular operation words, and is a word that is assumed to be emitted when the user wants to stop the progress of a job. Mainly, negative words such as "shimatta", "yabai", "chigau" and "machigatta", which deny the present situation, are treated as assumed words.

"Others" are words that are neither regular operation words nor assumed words. Various kinds of words, for example, exclamations such as "ah" and "uwah", which are considered to be instantly emitted, and a dialect word having the same meaning as a regular operation word or an assumed word, can be registered as other target voices.

With respect to the registration of target voices, the image processing device 1 includes a learning and memorizing part 90 that automatically updates contents of the word table 84. More specifically, the learning and memorizing part 90 has a function of, when it is detected that a target voice has been emitted, which causes the execution of a job to stop, and subsequently in a case where an instruction to delete the job is given to cancel the execution, correcting the grouping of the target voices in such a manner that the target voice is associated with the higher detection level 820 than the current one in the condition table 82.

The word table 84 shown in FIG. 8A indicates a state before the correction by the learning and memorizing part 90; and the word table 84b shown in FIG. 8B indicates a state after the correction by the learning and memorizing part 90.

In the state shown in FIG. 8A, all of "mazui", "ah" and "uwah", which are target voices, belong to the "others" group. Therefore, only when a word is emitted during a target setting period, the detection level 820 of which is "high" (refer to FIG. 7), it is detected that the word has been emitted.

Meanwhile, in the state shown in FIG. 8B, all of "mazui", "ah" and "uwah" belong to the "assumed word" group. The registration attribute is changed from "default" to "learning" that means registration by the learning and memorizing function. If a word is an assumed word, in a case where a word is emitted during a target setting period, the detection level 820 of which is "high" or "low" (refer to FIG. 7), it is detected that the word has been emitted.

Incidentally, the learning and memorizing part 90 may have an additional function of recording occurrence of a situation in which a certain target voice among the assumed words is emitted to cause the execution of the job to stop, and subsequently the execution of the job is canceled, and in a case where the same situation has occurred a predetermined number of times, promoting the target voice to a regular operation word.

Returning to FIG. 6, the "scan" is a job that transmits image data obtained by reading an image from the original document 5. At the time of setting a job by a user, an external device or a box in the image processing device 1 is specified as a destination The "fax transmission" is a job that converts image data obtained by reading an image from the original document 5 into a format that conforms to the prescriptions of facsimile communication, and then transmits the converted image data.

In the case of the "scan" and the "fax transmission", the auto document feeder 12 may be used, or the original document 5 may be set on the platen glass of the scanner 13 without using the auto document feeder 12. In a case where the number of sheets of the original document 5 is two or more, if the auto document feeder 12 is used, reading of the plurality of sheets, and the transmission of image data corresponding to the plurality of sheets are treated as one job. In a case where the auto document feeder 12 is not used, reading of one sheet, and the transmission of image data corresponding to the one sheet are treated as one job. Accordingly, jobs, the number of which is equivalent to the number of sheets of original document, are executed.

The "copy" is a job that prints an image on a sheet of paper on the basis of image data obtained by reading the image from a sheet of the original document 5. If a user sets the number of copies at two or more, the same image is printed on each of sheets of paper, and consequently a plurality of copies are obtained.

The "group copy" is a kind of multi-copy. The "group copy" consecutively reads images from a plurality of sheets of the original document 5 by using the auto document feeder 12, and on the basis of obtained image data, prints each of the plurality of images in units of a plurality of sheets. With respect to the "group copy", each of the plurality of images is printed in units of a plurality of sheets in the order of reading.

The "sorting copy" is also a kind of multi-copy. With respect to the "sorting copy", the operation of printing each of the plurality of images on one sheet of paper in the order of reading is repeated to make a plurality of copies.

With respect to the "scan" and the "fax transmission" among these kinds of jobs, the progress stages are an early stage of reading, during reading (other than the early stage), an early stage of transmission, and during transmission (other than the early stage).

The early stage of reading is a time period soon after the execution of a job is started. The early stage of reading is, for example, a time period after the auto document feeder 12 starts the transportation of the original document 5 until the transportation of the first or second sheet is completed. The early stage of reading may be shorter, or longer, than the above-described time period. It should be noted that in the case of the moving reading method, reading is performed while the original document 5 is transported, and therefore a time period during which the original document 5 is transported overlaps a time period during which reading is performed.

The "during reading" is a time period subsequent to the early stage of reading, and is a time period until reading from the last sheet of the original document 5 is completed.

The "early stage of transmission" is a time period subsequent to the "during reading", and is a time period until transmission of transmit data to a communication line is started. The "early stage of transmission" includes a time period during which the transmit data is prepared, and a time period during which a connection to a destination is made.

The "during transmission" is a time period subsequent to the "early stage of transmission", and is a time period until the execution of the job ends.

With respect to the "scan" and the "fax transmission", while the auto document feeder 12 consecutively takes out sheets of the original document 5 from the original document tray 12A, a user may notice, for example, that a sheet that is not intended to be transmitted is mixed, or that a direction or front and back is not correct.

Accordingly, at least the "early stage of reading" and the "during reading" are defined as setting periods. In other words, in a case where the voice detection mode is "execute/ not execute", "execute" (perform voice detection) is defined; and in the case of the "level change A" or the "level change B", "high" or "low" is defined as the detection level 820.

Meanwhile, since the "during transmission" comes after the reading time corresponding to the number of sheets of original document elapses from starting of the job, a user determines that user's own operation does not contain an error, and is waiting for completion of the job. Therefore, it is considered that the user rarely wants to stop the operation. Accordingly, the "during transmission" is defined as other than the setting period, or a setting period during which the detection level 820 is "low".

With respect to the "copy", the progress stages are an early stage of reading, during reading (other than the early stage), an early stage of printing, and during printing (other than the early stage).

The "early stage of reading" and the "during reading" are time periods similar to the "early stage of reading" and the "during reading" in the "scan" and the "fax transmission" respectively.

The early stage of printing is an early stage of printing operation, and is, for example, a time period after the first sheet of paper from the start of printing is discharged until a predetermined time period elapses.

The "during printing" is a time period subsequent to the "early stage of printing", and is a time period until the execution of the job ends.

With respect to the "copy", as with the "scan" and the "fax transmission", while the auto document feeder 12 consecutively transports sheets of the original document 5, a user may notice an error of the original document 5. In addition, even if there is no error of the original document 5, for example, in a case where sheets of the original document 5, which differ in size, are mixed, a user may notice that not paper size specification but automatic paper selection (APS)/automatic magnification selection (AMS) should have been specified.

Moreover, after printing is started, a user may notice, from a printed result of the first sheet discharged, that there has been a specification error of printing conditions such as a magnification ratio, a paper size, color settings, concentration, and page assignment.

Therefore, the "early stage of reading", the "during reading", and the "early stage of printing" are defined as setting periods. In order to prevent the operation from being uselessly stopped, the "during printing" is defined as other than the setting period, or a setting period during which the detection level 820 is "low".

With respect to the "group copy", the progress stages are an early stage of reading, during reading (other than the early stage), an early stage of printing, during printing A, during printing B, and during printing C.

The "early stage of reading", the "during reading", and the "early stage of printing" are time periods similar to the "early stage of reading", the "during reading", and the "early stage of printing" in the "copy" respectively.

The "during printing A" is a time period other than the early stage of printing in printing of the first page (the first sheet of the original document 5).

The "during printing B" is an early stage of printing of each page after the second page (the second page or later of the original document 5).

The "during printing C" is a time period other than the early stage of printing of each page from the second page or later (the second page or later of the original document 5).

In the "group copy", in an early stage of printing each page, a user may notice, from a printing result of the previous page, that there has been a specification error of printing conditions such as a color mode. In particular, in an early stage of printing of the second page, in which the number of sheets printed for the first page can be known, a user may notice that there has been a specification error of the number of copies.

In consideration of the circumstances, and the situation or the like in which the user notices, for example, an error of the original document 5 or a specification error of the printing conditions, setting periods or the detection levels 820 are defined for the "group copy" as shown in the figure.

With respect to the "sorting copy", the progress stages are an early stage of reading, during reading (other than the early stage), an early stage of printing, during printing D, during printing E, during printing F, during printing G, and during printing H.

The "early stage of reading", the "during reading", and the "early stage of printing" are time periods similar to the "early stage of reading", the "during reading", and the "early stage of printing" in the "copy" respectively.

The "during printing D" is a time period other than the early stage of printing of the first copy. The "during printing E" is immediately after the completion of printing of the first copy (a time period until a predetermined time period elapses from the completion). In other words, the "during printing E" is an early stage of printing of the second copy.

The "during printing F" is a time period other than the early stage of printing of the second copy. The "during printing G" is immediately after the completion of printing of each copy of the second copy or later excluding the last copy. The "during printing H" is a time period other than the early stage of printing of each copy of the third copy or later.

In the "sorting copy", when a bundle of sheets for the first copy is discharged, a user may notice that there has been a specification error of a finishing mode such as staple stop or punch boring. In addition, after printing of the desired number of copies has been completed, when printing of the next copies is started, a user may notice that the number of copies specified has been larger than a desired value. As a result of forgetting about specifying the number of copies, the specification of the previous job may often be applied.

In consideration of the circumstances, and the situation or the like in which the user notices, for example, an error of the original document 5 or a specification error of the printing conditions, setting periods or the detection levels 820 are defined for the "sorting copy" as shown in the figure.

Figure 9:
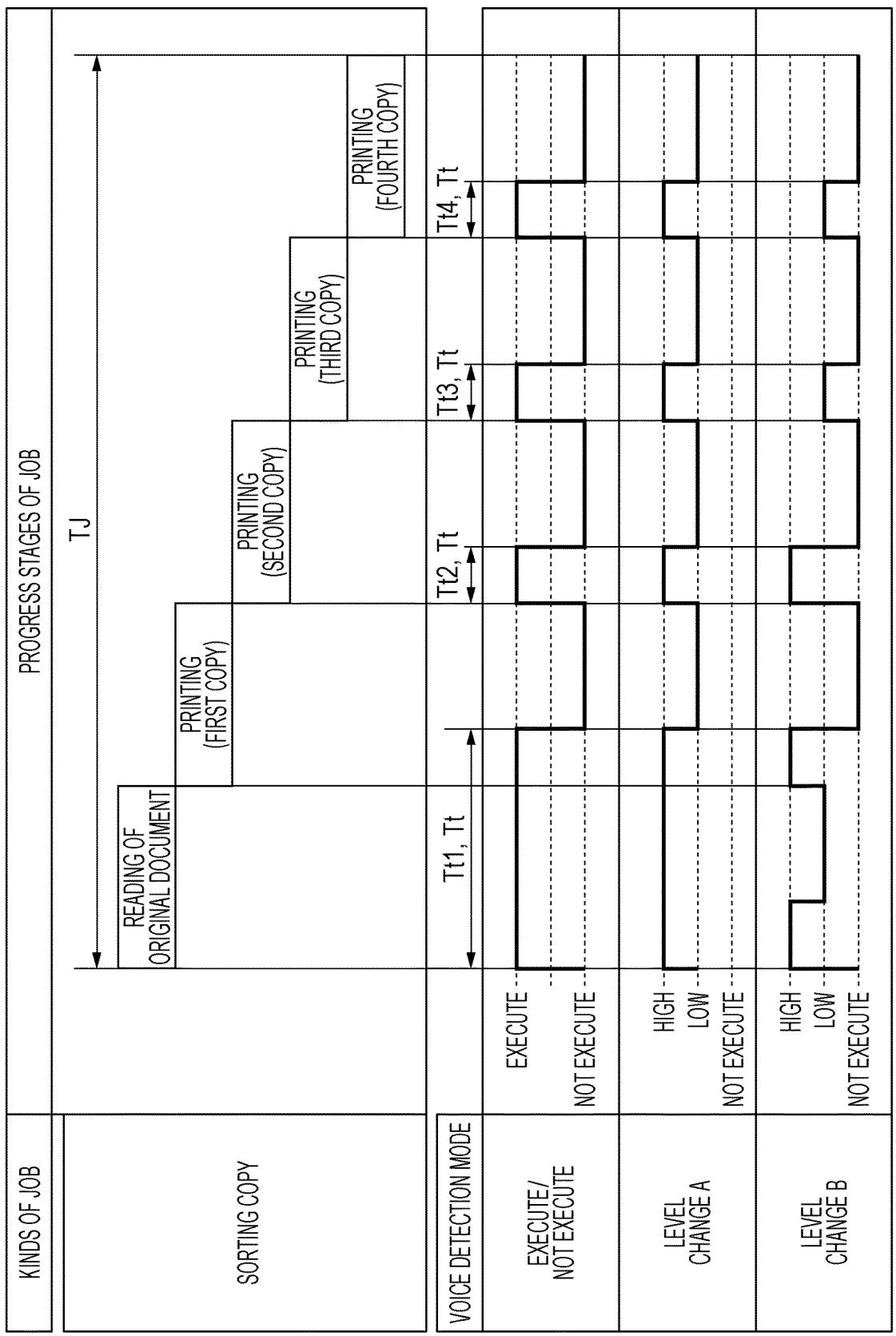
FIG. 9 is a drawing illustrating a target setting period in sorting copy.
Figure 10:
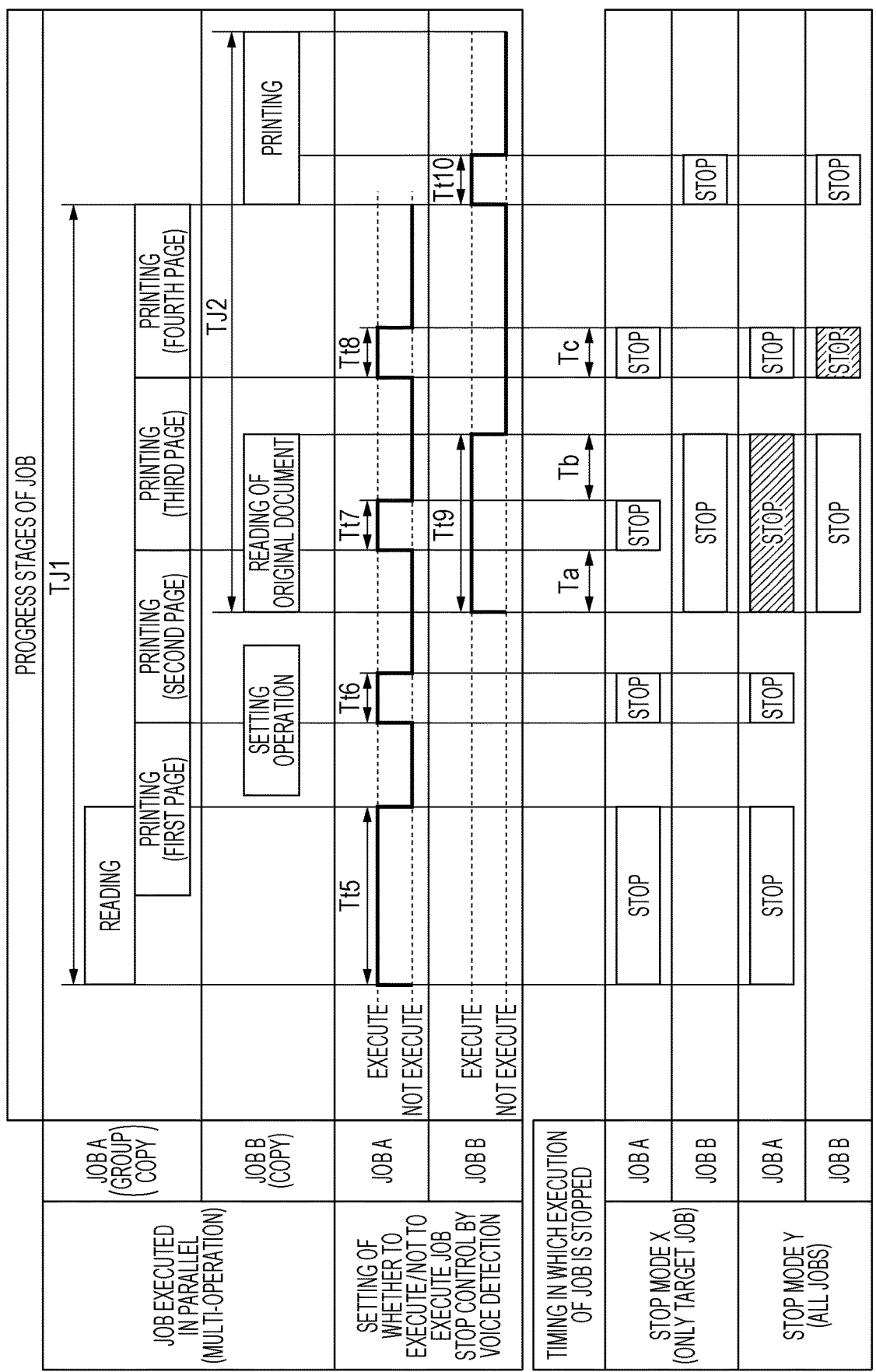
FIG. 10 is a drawing illustrating a target stop period during which detection of a target voice is reflected in stopping of execution of a job in multi-operation.

FIG. 9 illustrates a target setting period Tt in sorting copy; and FIG. 10 illustrates an example of a mode in which detection of a target voice is reflected in stopping of the execution of a job in the multi-operation.

FIG. 9 indicates setting periods defined for sorting copy in the period table 80 shown in FIG. 6 in the form of a timing chart. FIG. 9 shows, as an example, a case where four copies are made.

An execution period TJ of a job is divided into an original document reading period during which images are read from a plurality of sheets of the original document 5, and printing periods of respective copies. The "early stage of reading" and the "during reading" among the progress stages of sorting copy are included in the reading period. The "early stage of printing" and each of the "during printing D to H" are included in any of the printing periods of the respective copies.

In the example shown in FIG. 9, irrespective of voice detection modes, four target setting periods Tt (Tt1, Tt2, Tt3, Tt4) are provided at the time of the execution of a job. When a target voice is detected in any of these target setting periods Tt1 to Tt4, the execution of the job is stopped.

Next, a mode of a voice operation function in the multi-operation will be described with reference to FIG. 10.

In an example shown in FIG. 10, a Job A and a job B are executed in parallel. A kind of the job A is, for example, the "group copy"; and a kind of the job B is, for example, the "copy". Incidentally, it is not always necessary to adapt the plurality of jobs executed in parallel to differ in kind The same kind of jobs may be executed in parallel.

In the example shown in FIG. 10, the execution of the job A is started earlier, and input operation of the job B is performed by a user around the time when the original document reading operation of the job A is completed. Subsequently, the original document reading operation of the job B is performed in parallel with the printing operation of the job A. After that, when printing of the last page of the job A ends (at this point of time, the execution of the job A ends), the printing operation of the job B is started.

The execution period TJ1 of the job A is provided with four target setting periods Tt5, Tt6, Tt7, Tt8 on the basis of the period table 80; and the execution period TJ2 of the job B is provided with two target setting periods Tt9, Tt10 on the basis of the period table 80 in the same manner. With respect to the target setting periods Tt9, Tt10 of the job B, a part of the target setting period Tt9 overlaps the target setting period Tt7 of the job A.

There are two modes (a stop mode X and a stop mode Y) of stopping the execution of the job in the multi-operation.

The stop mode X is a mode in which when a target voice is detected during any of the target setting periods Tt, only for a job that is provided with the target setting period Tt, the execution of the job is stopped, and the execution of the other jobs are continued. According to the stop mode X, the number of jobs, the execution of which is uselessly stopped, is reduced, thereby enabling to suppress a decrease in productivity.

It should be noted that by identifying a user who has emitted a target voice, and by stopping the execution of only a job input by the identified user, even in a case where the target setting period Tt of the job overlaps that of another job, it is not necessary to stop the execution of the another job.

The stop mode Y is a mode in which when a target voice is detected during any of the target setting periods Tt, the executions of all jobs are stopped. According to the stop mode Y, high-level voice detection that identifies a user who has emitted a target voice is not required, and therefore a load of processing in the voice recognition part 21 or the like can be reduced.

As shown in FIG. 10, in a case where the stop mode X is selected, the execution of the job A is stopped when a target voice is detected during any of the target setting periods Tt5 to Tt8. The execution of the job B is stopped when a target voice is detected during either of the target setting periods Tt9, Tt10.

Meanwhile, in a case where the stop mode Y is selected, the execution of the job A is stopped when a target voice is detected during any of the target setting periods Tt5 to Tt8 and the time periods Ta, Tb indicated with oblique lines in the figure. The time periods Ta, Tb are time periods that do not overlap the target setting period Tt7 in the target setting period Tt9 of the job B. In addition, the execution of the job B is stopped when a target voice is detected during any of the target setting periods Tt9, Tt10 and the time period Tc indicated with oblique lines in the figure. The time period Tc is the target setting period Tt8 of the job A.

Figure 11:
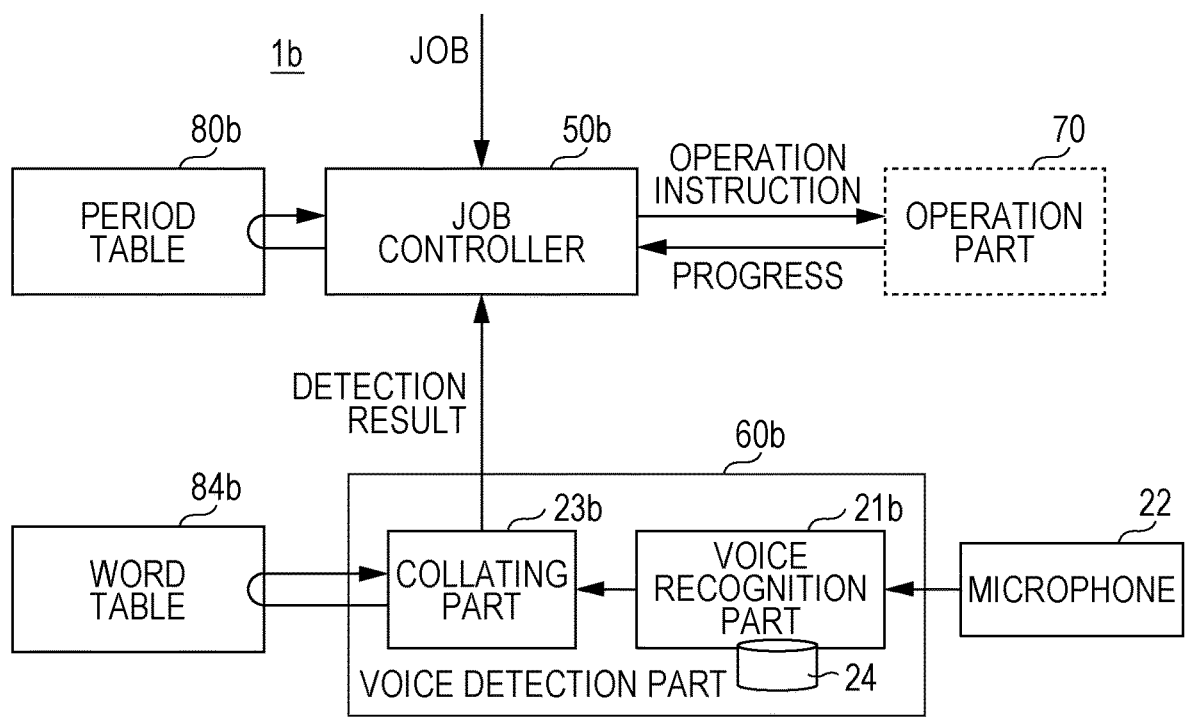
FIG. 11 is a diagram illustrating a second example of a functional configuration of essential parts related to a voice operation function.
Figure 12:
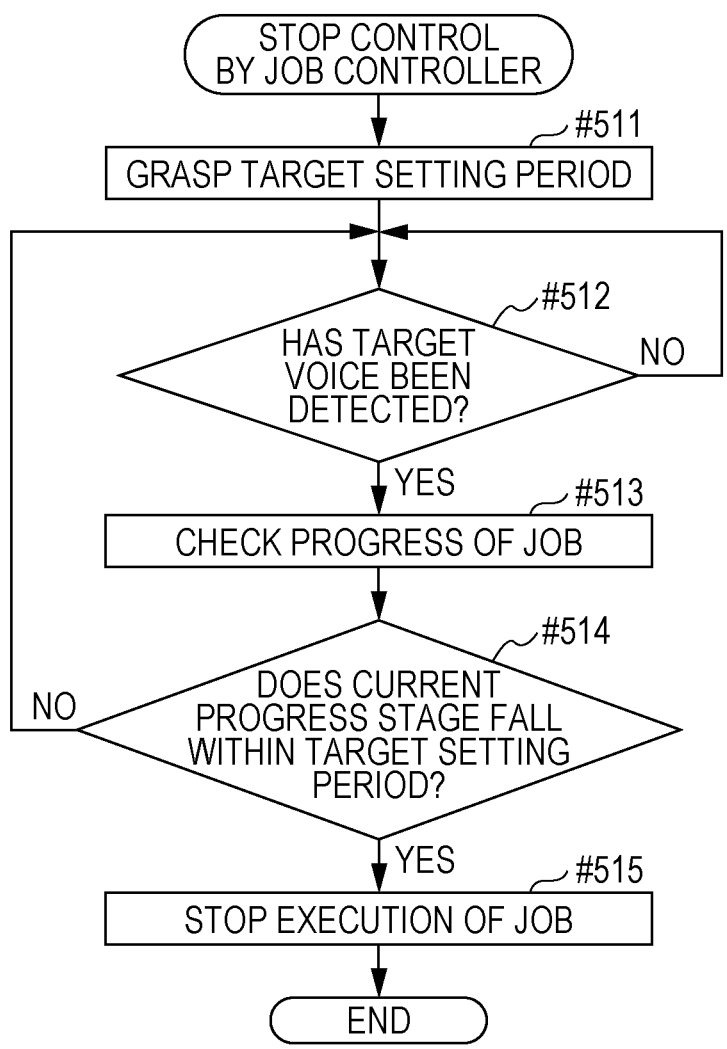
FIG. 12 is a drawing illustrating a flow of stop control processing in the job controller.
Figure 13:
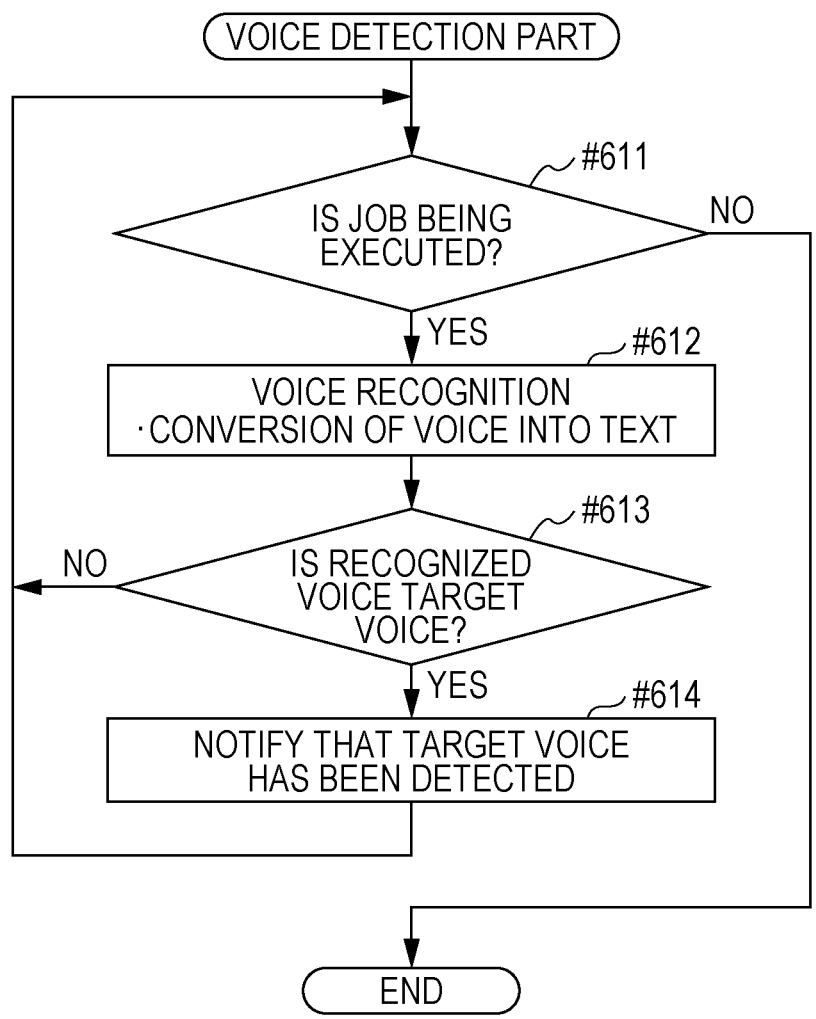
FIG. 13 is a drawing illustrating a process flow in the voice detection part.

FIG. 11 illustrates a second example of a functional configuration of essential parts related to the voice operation function; FIG. 12 illustrates a flow of stop control processing in a job controller 50b; and FIG. 13 illustrates a flow of processing in the voice detection part. In addition, FIG. 14 illustrates an example of data of the period table 80b. In FIG. 11, components corresponding to the modified example of the components shown in FIG. 3 are denoted with similar reference numerals suffixed with the alphabetical letter "b", and explanations of these components are simplified.

In FIG. 11, an image processing device 1b includes a job controller 50b, a voice detection part 60b, the period table 80b, and a word table 84b.

The job controller 50b controls the execution of an input job. In other words, the job controller 50b gives an operation instruction to an operation part 70 according to a job to be executed. In addition, the job controller 50b realizes the voice operation function in conjunction with the voice detection part 60b. A mode of the conjunction of the job controller 50b with the voice detection part 60b differs from the example of FIG. 3 described above.

In the example shown in FIG. 3, the job controller 50 controls the voice detection part 60 in such a manner that the voice detection part 60 performs voice detection only during the target setting period Tt. Differently from this, in the example shown in FIG. 11, the voice detection part 60b performs the voice detection during the execution of the job. When the job controller 50b is notified of a detection result indicating that a target voice has been detected, the job controller 50b determines, on the basis of the period table 80b, whether or not the target voice has been detected during the target setting period Tt. Subsequently, in a case where it is determined that the target voice has been detected during the target setting period Tt, the execution of the job is immediately stopped.

As shown in FIG. 14, the period table 80b indicates setting periods that are defined beforehand according to the kinds of jobs respectively. The kinds of jobs, and categories of progress stages of each job, are similar to those of the period table 80 shown in FIG. 6. In the period table 80b, by defining whether "to execute (perform)" or "not to execute (not to perform)" the stop control according to a result of the voice detection, each progress stage is defined as a setting period or a period other than the setting period.

The voice recognition part 21b of the voice detection part 60b converts a voice input from the microphone 22 into a text, the voice falling within a predetermined volume range.

A collating part 23b collates the text from the voice recognition part 21 with a plurality of target voices registered in the word table 84b. In a case where the text agrees with any of the target voices, the job controller 50b is notified of a detection result indicating that the target voice has been detected.

Differently from the example shown in FIGS. 8A and 8B, the word table 84b in which target voices are not grouped may be used. However, the word table 84b in which target voices are grouped may be used too. In a case where the word table 84b in which target voices are grouped is used, an identifier of a group to which the agreed target voice belongs can be included in the detection result.

As shown in FIG. 12, the job controller 50b refers to the period table 80b before the execution of a job, thereby grasping a target setting period that is a setting period determined corresponding to the kind of the job, which is a target to be executed, among the setting periods recorded according to the respective kinds (#511).

During the execution of the job, when the voice detection part 60 notifies of a detection result indicating that a target voice has been detected (YES in #512), the progress of the job is checked (#513), and whether or not the current progress stage falls within a target setting period is determined (#514).

Subsequently, in a case where it is determined that the current progress stage falls within the target setting period (YES in #514), the execution of the job is stopped. In a case where it is determined that the current progress stage does not fall within the target setting period (NO in #514), the job controller 50b waits for a notification of a result of detecting a target voice without stopping the execution of the job (#512).

As shown in FIG. 13, when a job is being executed (YES in #611), the voice detection part 60b performs voice recognition (#612). Subsequently, it is checked whether or not the recognized voice is a target voice (#613), and in a case where the recognized voice is a target voice (YES in #613), the voice detection part 60b notifies that a target voice has been detected (#614).

Figure 15:
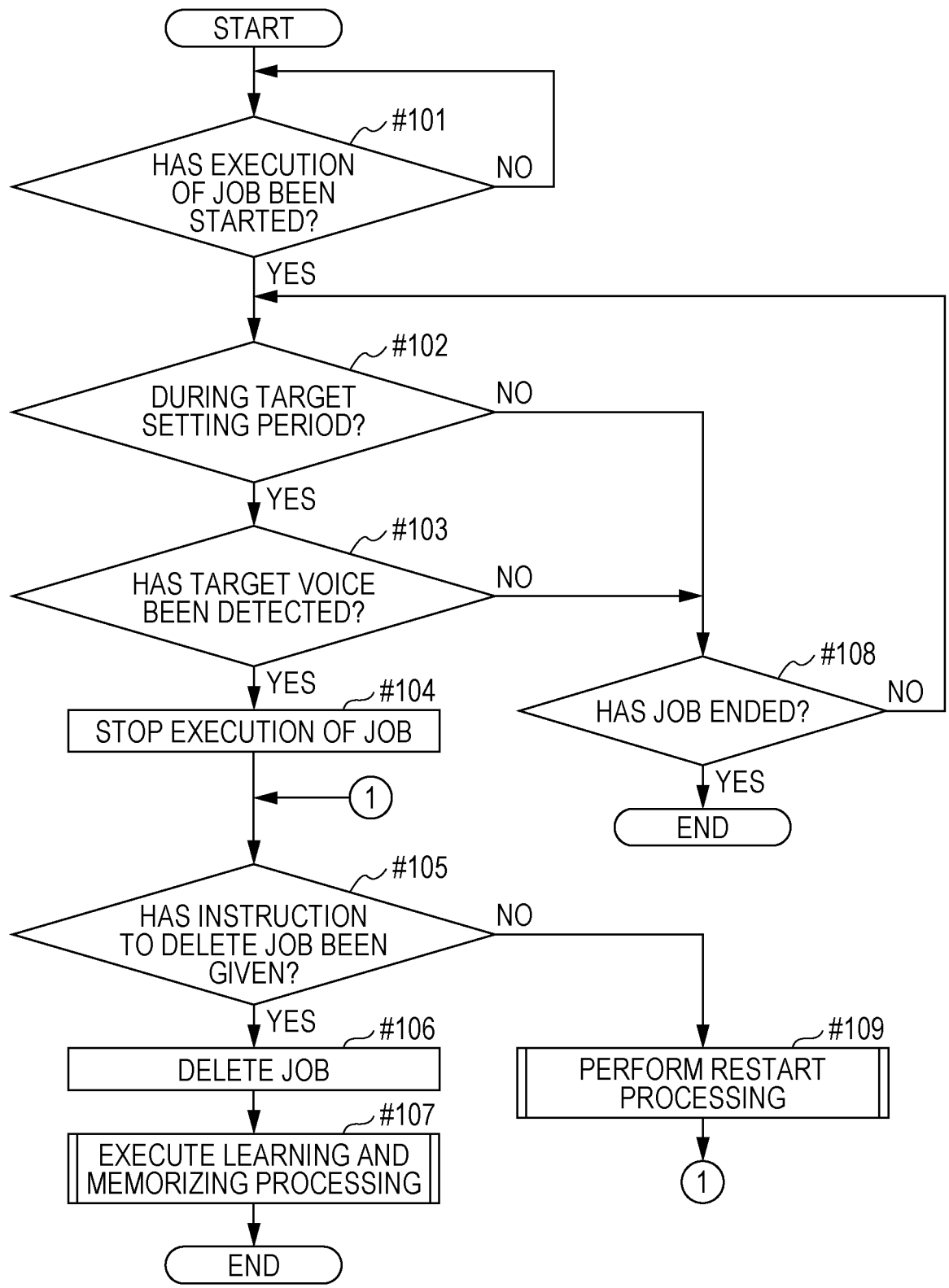
FIG. 15 is a drawing illustrating a flow of processing in the image processing device.
Figure 16:
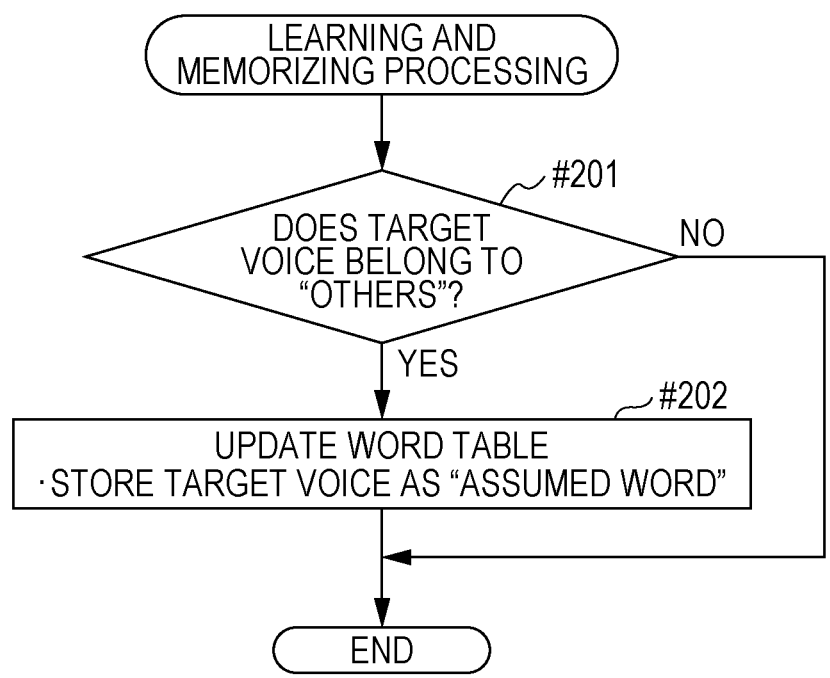
FIG. 16 is a drawing illustrating a flow of learning and memorizing processing.
Figure 17:
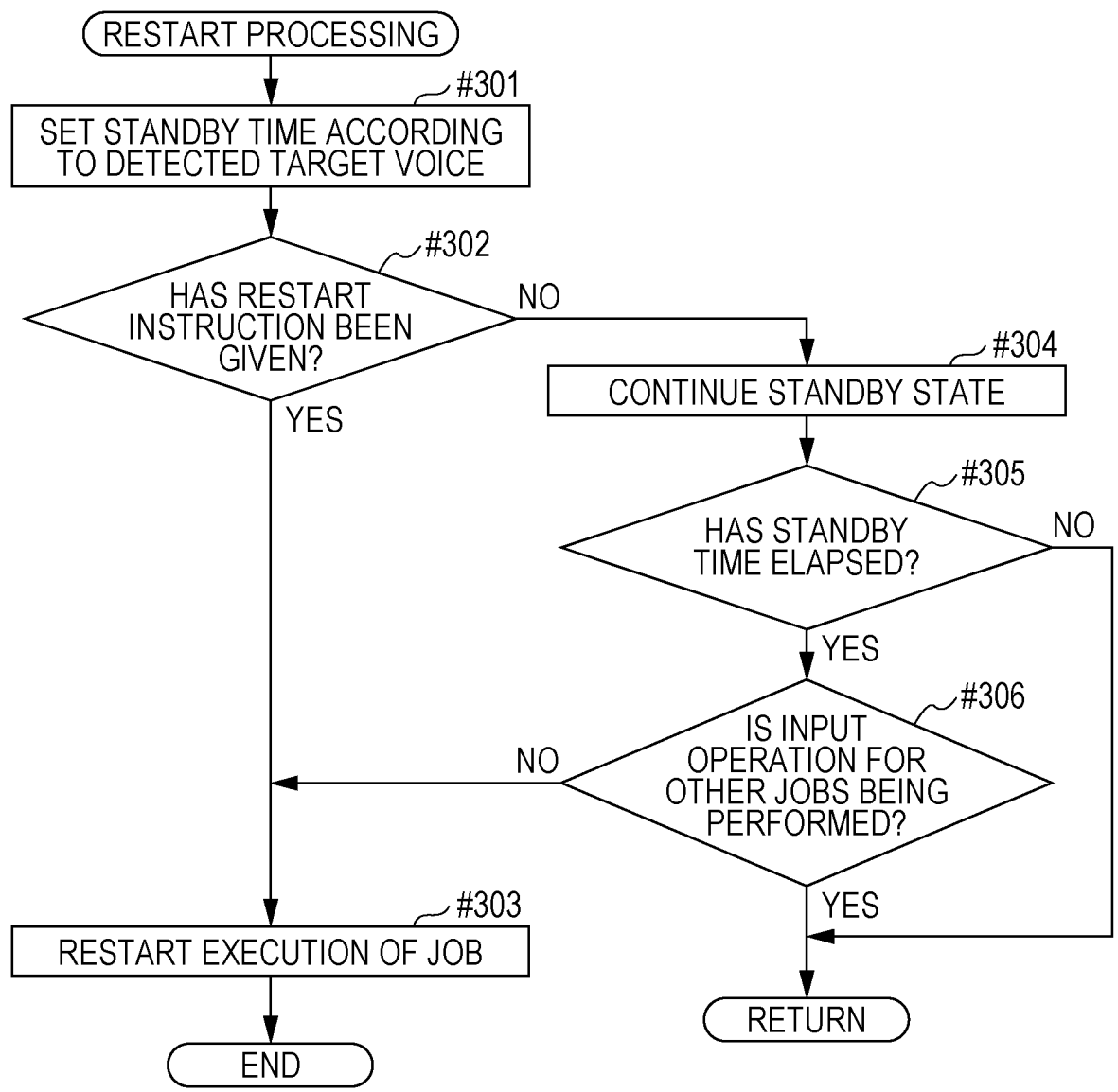
FIG. 17 is a drawing illustrating a flow of restart processing.

FIG. 15 illustrates a flow of processing in the image processing device 1; FIG. 16 illustrates a flow of learning and memorizing processing; and FIG. 17 illustrates a flow of restart processing.

As shown in FIG. 15, after the execution of a job is started (YES in #101), it is checked whether or not a target voice has been detected during the target setting period Tt (#102, #103). When the job ends with no target voice detected (YES in #108), the processing in FIG. 15 ends.

In a case where a target voice has been detected during the target setting period Tt (YES in #103), the execution of the job is stopped, and is brought into a standby state (#104).

When input operation of instructing deletion of the job is performed during the standby state (YES in #105), the job is deleted according to the instruction (#106), and learning and memorizing processing is executed (#107).

While no input operation of instructing deletion of the job is performed during the standby state (NO in #105), restart processing of accepting an instruction to restart is performed (#109).

As shown in FIG. 16, in the learning and memorizing processing, in a case where a group of a detected target voice is "others" (YES in #201), the word table 84 is updated in such a manner that the target voice belongs to the "assumed words" group (#202).

As shown in FIG. 17, in the restart processing, the standby time is set at first time (longish) or second time (shortish) according to a group to which the detected target voice belongs (#301).

When input operation of instructing restarting of the job is performed (YES in #302), the execution of the job is restarted according to the instruction (#303). The instruction is input, for example, by touching a restart button displayed on the touch panel display 11A. Input of a voice instruction may be accepted.

In a case where no instruction to restart is received (NO in #302), if the standby time does not elapse (NO in #305), the process returns to the flow of FIG. 15. In this case, the standby state is continued (#304).

After a lapse of the standby time (YES in #305), it is checked whether or not input operation for other jobs is being performed (#306). If it is determined that no input operation is being performed (NO in #306), the execution of the job is restarted (#303).

If input operation for other jobs is being performed (YES in #306), the process returns to the flow of FIG. 15. In this case, after waiting until the input operation ends, the execution of the job is restarted.

The reason for waiting until the input operation ends is based on the assumption that a user who has instructed restarting does not want to disturb the operation by other users.

Figure 18:
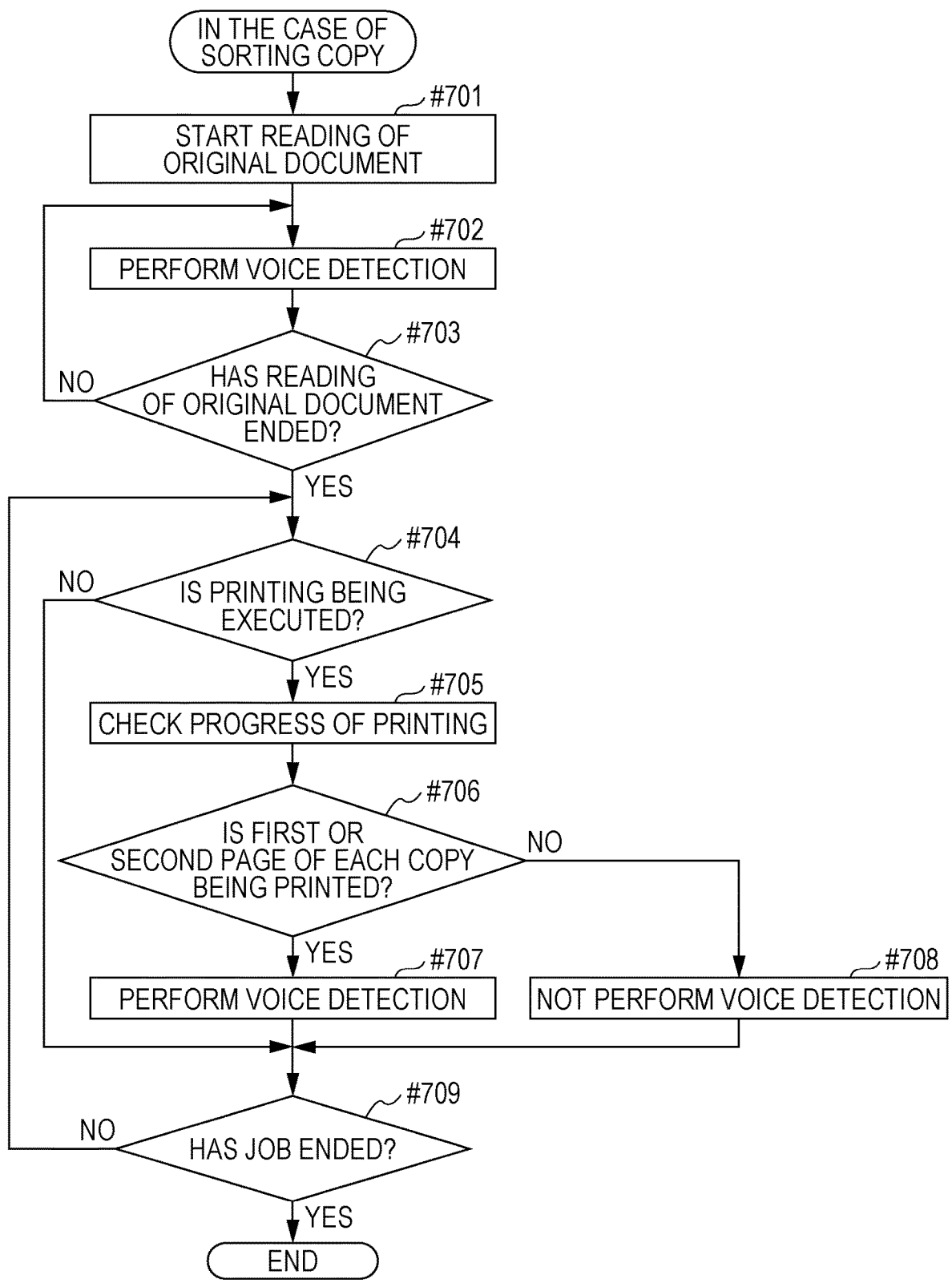
FIG. 18 is a drawing illustrating a flow of processing of the image processing device in sorting copy.

FIG. 18 illustrates a flow of processing of the image processing device 1 in sorting copy. Referring to FIGS. 6 and 9, reading of an original document is started (#701), and voice detection is performed until reading of the original document ends (NO in #702, #703). While printing is performed (YES in #704), a progress of the printing is checked (#705).

In an early stage of printing of each copy, in other words, while the first or second page is printed (YES in #706, NO in #709), voice detection is performed (#707). If printing is not in an early stage (NO in #706), voice detection is not performed (#708).

According to the embodiments described above, the stop control by voice detection is performed with the timing limited to a time period defined according to a kind of a job. This enables to suppress useless stop of the execution of the job, and enables to suppress the occurrence of a situation in which a user cannot stop the operation by a voice.

In the embodiments described above, the voice detector provided in the image processing device 1 may be any voice detector capable of detecting a voice emitted by a user, and thus is not limited to the microphone 22. The voice detector may be a means for receiving an audio signal from, for example, a smart phone, a wireless microphone or the like that is carried by a user. Further, in a case where a user remotely operates the image processing device 1 from a personal computer or the like, the voice detector may be a means for receiving an audio signal that is input into a microphone provided in the personal computer.

The image processing device 1 may be configured in such a manner that respective voices of a plurality of users are registered beforehand, and when a user who has input a job has emitted a target voice, the execution of the job is stopped. In other words, authority to instruct stopping by a voice can be given only to the user who has input the job that is being executed. The authority to instruct stopping by a voice may be given to an administrator of the image processing device 1 even if the administrator is not the user who has input the job.

Besides the above, for example, the configuration of the whole or part of the image processing device 1, the contents of processing, the order or the timing, the categories of detection levels, and the contents of each of the tables 80, 80b, 82, 82b, 84, 84b can be changed as appropriate according to the gist of the present invention.

Although embodiments of the present invention have been described and illustrated in detail, the disclosed embodiments are made for purposes of illustration and example only and not limitation The scope of the present invention should be interpreted by terms of the appended claims.

What is claimed is:

1. An image processing device capable of executing a plurality of jobs that differ in kind, the image processing device comprising:
   a controller that controls execution of an input job; and
   a detection part that, on the basis of a voice detected by a voice detector, detects that any of a plurality of predetermined target voices has been emitted, and
   a table in which setting periods are defined beforehand according to respective kinds of jobs is stored,
   when it is detected that the target voice has been emitted during the stored target setting period corresponding to the type of job that is being executed, the controller stops the execution of the job.

2. The image processing device according to claim 1, wherein:
   the detection part detects the target voice during the execution of the job; and
   when the target voice has been detected, the controller determines, on the basis of the table, whether or not the execution of the job is stopped.

3. The image processing device according to claim 1, wherein:
   on the basis of the table, the controller controls the detection part in such a manner that the target voice is detected only during the target setting period, and when the target voice is detected, the execution of the job is stopped.

4. The image processing device according to claim 3, wherein:
   the table defines any of a plurality of detection levels each indicating easiness to obtain a detection result that the target voice has been emitted during the target time period;
   a subtable that indicates detection conditions each corresponding to the plurality of detection levels is stored; and
   the detection part detects the target voice according to the detection conditions at that point of time identified by the table and the subtable.

5. The image processing device according to claim 4, wherein:
   the detection conditions include at least a voice specification condition that specifies a target voice, the emission of which should be detected; and
   among the plurality of detection levels, the highest detection level is associated with all of the plurality of target voices as the voice specification condition, and the second highest or lower detection levels are associated with a part of the plurality of target voices as the voice specification condition in such a manner that with the decrease in level, the number of corresponding target voices decreases.

6. The image processing device according to claim 5, wherein
   the plurality of target voices are grouped into groups, the number of which is the same as the number of detection levels, and in the subtable, among the plurality of detection levels, the highest detection level is associated with all of the groups as the voice specification condition, and the second highest or lower detection levels are associated with the one or more groups as the voice specification condition in such a manner that with the decrease in level, the number of corresponding groups decreases.

7. The image processing device according to claim 6, further comprising
   a learning and memorizing part that, after the execution of the job is stopped as the result of detecting the target voice, in a case where the execution of the job is canceled, changes a group to which the target voice belongs in such a manner that the target voice is associated with a higher detection level than the current detection level in the subtable.

8. The image processing device according to claim 1, wherein:
   the job performs at least two of reading processing of reading an image from a sheet, print processing of forming an image on a sheet, and communication processing of transmitting image data to an external device; and
   the controller executes the plurality of jobs in parallel, and in a case where the target voice is detected during the target setting period of any of these jobs, stops the execution of the plurality of jobs all together.

9. The image processing device according to claim 1, wherein:
   when the target voice is detected, the detection part or the controller identifies a user who has emitted the target voice; and
   only when the identified user has authority to stop the job that is being executed, the controller stops the execution of the job.

10. The image processing device according to claim 1, wherein
    when the standby time has passed without accepting any operation of instructing to cancel or restart the execution of the job since the execution of the job was stopped, the controller restarts the execution of the job.

11. The image processing device according to claim 5, wherein:
    when the standby time has passed without accepting any operation of instructing to cancel or restart the execution of the job since the execution of the job was stopped, the controller restarts the execution of the job; and
    in a case where the target voice corresponding only to the lowest detection level has been detected, with the result that the execution of the job is stopped, the standby time is the first time, and in a case where the target voice corresponding only to the highest detection level has been detected, with the result that the execution of the job is stopped, the standby time is the second time that is shorter than the first time.

12. The image processing device according to claim 10, wherein
    in a case where the standby time has passed while input operation of setting a job other than the job, the execution of which has been stopped, is performed, the controller waits until the input operation ends, and then restarts the execution of the job.

13. An operation control method of an image processing device capable of executing a plurality of jobs that differ in kind, the method comprising:
    performing detection processing of detecting that any of a plurality of predetermined target voices has been emitted during a target setting period corresponding to a job that is being executed, among setting periods that are defined beforehand according to kinds of jobs respectively and stored in a table; and when it is detected that the target voice has been emitted during the defined target setting period, stopping the execution of the job.

14. The operation control method of the image processing device according to claim 13, wherein:
- the detection processing is processing of detecting the target voice only during the target setting period;
- any of a plurality of detection levels that each indicate easiness to obtain a detection result that the target voice has been emitted is defined for the setting period corresponding to each of the plurality of jobs, and detection conditions each corresponding to the plurality of detection levels are defined beforehand; and
- in the detection processing, the target voice is detected according to the detection conditions each corresponding to the detection levels defined for the target setting periods.

15. The operation control method of the image processing device according to claim 14, wherein:
- the detection conditions include at least a voice specification condition that specifies a target voice, the emission of which should be detected; and
- among the plurality of detection levels, the highest detection level is associated with all of the plurality of target voices as the voice specification condition, and the second highest or lower detection levels are associated with a part of the plurality of target voices as the voice specification condition in such a manner that with the decrease in level, the number of corresponding target voices decreases.

\* \* \* \* \*